G. W. FENLEY.
Rotary Cultivator and Chopper.

No. 163,061. Patented May 11, 1875.

WITNESSES:
A. W. Almqvist
J. H. Scarborough

INVENTOR:
G. W. Fenley
BY
ATTORNEYS.

THE GRAPHIC CO. PHOTO-LITH. 39 & 41 PARK PLACE, N.Y.

UNITED STATES PATENT OFFICE.

GEORGE W. FENLEY, OF NACOGDOCHES, TEXAS.

IMPROVEMENT IN ROTARY CULTIVATORS AND CHOPPERS.

Specification forming part of Letters Patent No. 163,061, dated May 11, 1875; application filed March 6, 1875.

Figure 1:
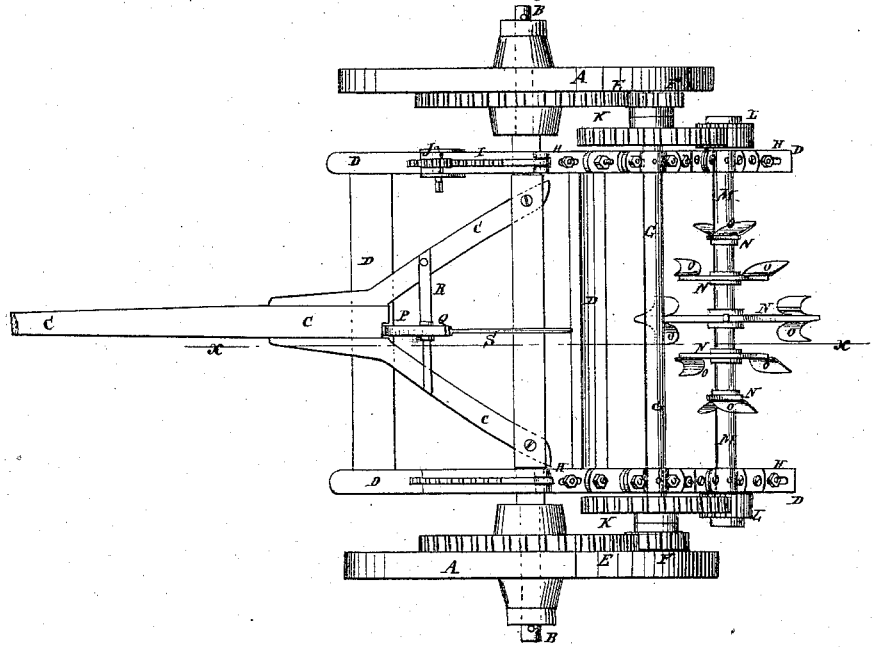
Figure 2:
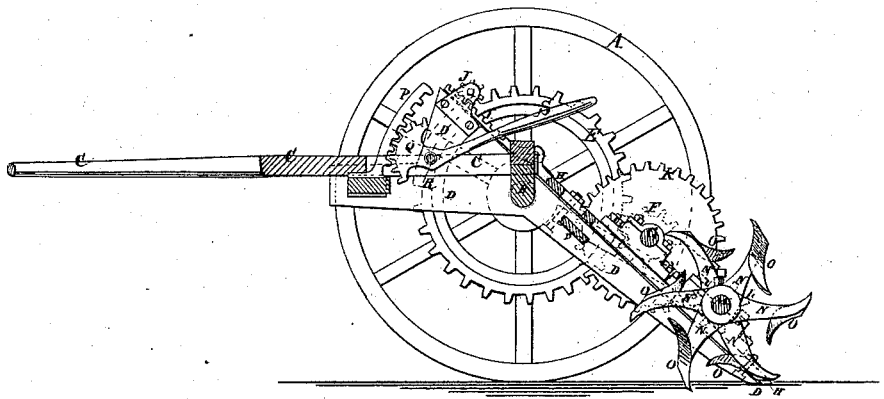
Figure 3:
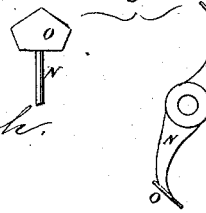

To all whom it may concern:

Be it known that I, GEORGE W. FENLEY, of Nacogdoches, in the county of Nacogdoches and State of Texas, have invented a new and useful Improvement in Rotary Cultivator and Chopper, of which the following is a specification:

Figure 1 is a top view of my improved machine. Fig. 2 is a vertical section of the same, taken through the line $x\ x$, Fig. 1. Fig. 3 shows detail views of one of the hoes or choppers.

Similar letters of reference indicate corresponding parts.

The invention will first be fully described, and then pointed out in the claims.

A are the wheels, which revolve upon the journals of the axle B, to which the tongue C is rigidly attached. D is a frame, which rides upon the axle B, and the rear parts of the side bars of which incline downward, so as to reach or nearly reach the ground. To the inner sides of the wheels A are attached gear-wheels E, into the teeth of which mesh the teeth of the small gear-wheels F, attached to the ends of the shaft G. The shaft G revolves in bearings attached to two bars, H, that are placed upon the inclined side bars of the frame D, and are secured in place by bolts, which pass through holes in the said side bars of the frame D, and through short slots in the said bars H, so that the bars H can be moved longitudinally to throw the wheels F out of and into gear with the wheels E. To the upper or forward ends of the bars H are pivoted two rack-bars, I, into the teeth of which mesh the teeth of two small gear-wheels, J. The wheels J are pivoted to supports attached to the forward ends of the inclined side bars of the frame D, and are operated to throw the machine into and out of gear by levers attached to them or to their journals, and which move along bars having notches formed in them to receive the said levers, and thus lock the machine in and out of gear. The levers and notched bars are not shown in the drawings. To the shaft G, near its ends, are attached two large gear-wheels, K, the teeth of which mesh into the teeth of two small gear-wheels, L, attached to the ends of the shaft M. The shaft M revolves in bearings attached to the rear parts of the bars H. N are the plow-standards, which have holes formed through their centers to receive the shaft M, upon which they are secured adjustably by set-screws. To each end of the double standards N are attached the plows O, which may be turn-plows, as shown in Figs. 1 and 2, hoes or chopper, as shown in Fig. 3, or any other desired kind of plow. When the plows are desired to throw the soil to or from the center, the standards are adjusted upon the shaft M in V form, as shown in Figs. 1 and 2, so that the two outer plows may strike the ground first, then the next two, and so on to the middle one. In chopping, the standards N are adjusted upon the shaft M at such a distance apart as to leave enough stalks for a stand between them when the machine is drawn across the rows. The forward cross-bar of the frame D is placed below the tongue C, and to it is attached the lower end of a curved rack-bar, P, into the teeth of which mesh the teeth of a segment of a gear-wheel, Q, which works upon a rod or bar, R, attached to the hounds of the tongue C. To the segmental gear-wheel Q is attached, or upon it is formed, a lever, S, which projects into such a position that it may be conveniently reached and operated to raise and lower the rear end of the frame D, and with it the plows, for convenience in passing obstructions, turning, &c. To the rear ends of the side bars of the frame D may be attached caster-wheels, the standards of which may be made adjustable, by means of nuts or other convenient means, so that the said caster-wheels may serve as gage-wheels to regulate the depth to which the plows enter the ground.

Having thus described my invention, I claim as new, and desire to secure by Letters Patent—

1. The combination of the sliding bars H, the gear-wheels E F K L, and the plow-shaft M with the frame D and the wheels A, substantially as herein shown and described.

2. The combination of the rack-bars I and gear-wheels J with the frame D and the sliding bars H, that carry the gearing F K L and the plow-shaft M, substantially as herein shown and described.

GEORGE W. FENLEY.

Witnesses:
ROBT. H. IRIAN,
JOHN DURST.